United States Patent Office 2,848,150
Patented Aug. 19, 1958

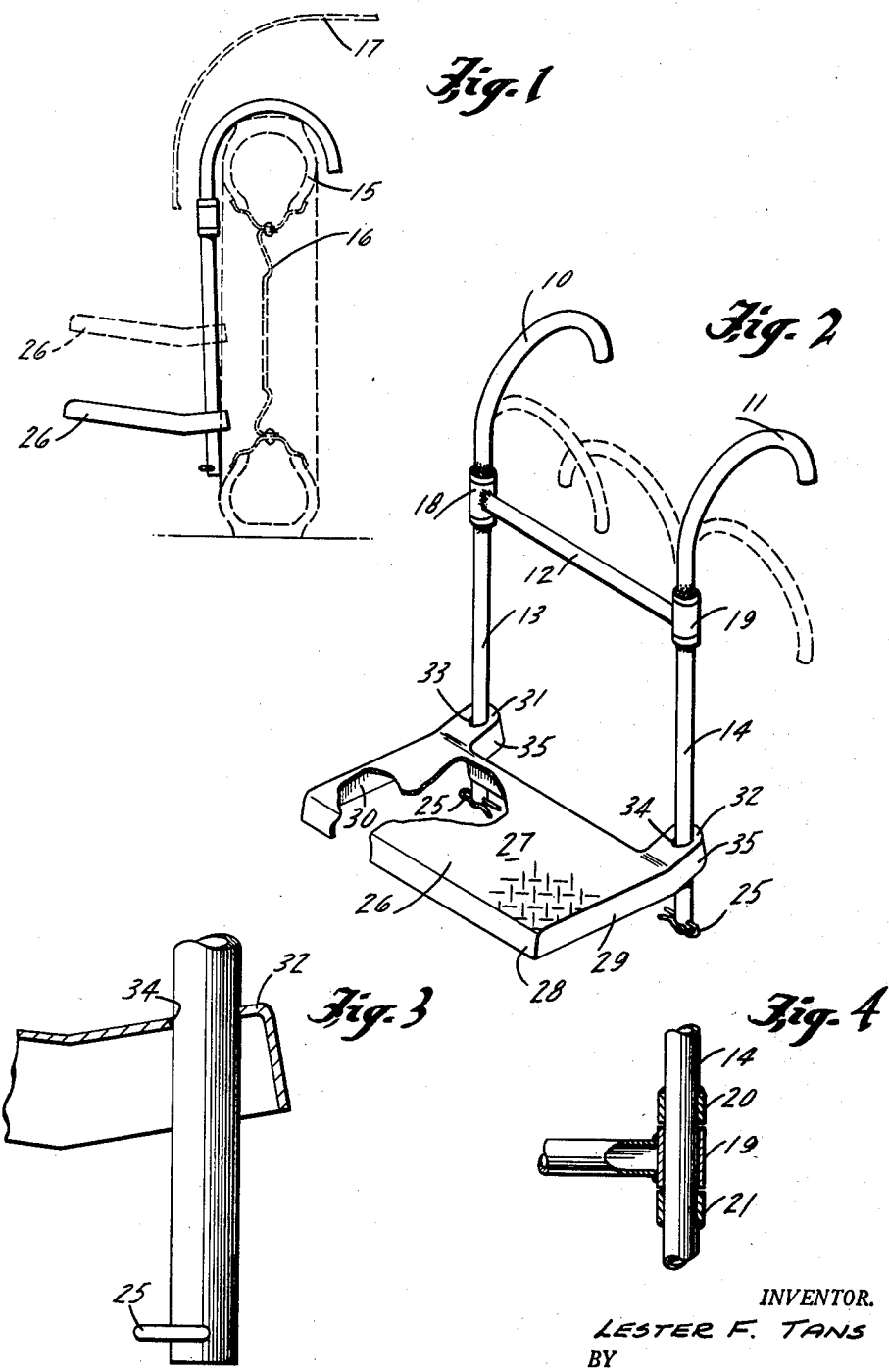

2,848,150

MECHANICS' LADDERS

Lester F. Tans, Waukesha, Wis.

Application January 24, 1955, Serial No. 483,759

1 Claim. (Cl. 228—36)

My invention relates to improvements in mechanic's ladders.

In modern automotive vehicles, and particularly automobile trucks, the location of the power unit, such as a gasoline or diesel operated internal combustion engine, is relatively inaccessible because of the broad contours of the fenders or other body structure of the vehicle. This requires that a mechanic have some supporting device, such as a box or ladder, to give him an elevated position from which to work. I have therefore provided a mechanic's ladder which not only provides the elevated position from which to work, but is also adapted to be mounted upon the front tire of the vehicle to secure the support close to the place where the mechanic must work. This avoids the difficulty heretofore encountered where a separate box is used and the box may slide dangerously.

I have provided, in a very simple device, adjustable hooks to engage over the top portion of a tire and combined the features of adjustability of the tire hooks with features of adjustability respecting the height of the ladder tread so that the entire device is collapsible and disassemblable for ready storage or transportation.

In the drawings:

Fig. 1 is a side elevation of my improved mechanic's ladder, portions of a vehicle wheel and vehicle fender being shown in dotted lines in vertical section to illustrate the position which my ladder takes when in use.

Fig. 2 is a perspective of my complete mechanic's ladder, a portion of the step of the ladder being broken away to exhibit parts therebeneath, and the tire hooks of the ladder being shown in dotted lines in various positions of retraction.

Fig. 3 is an enlarged detail showing a portion of the step and a portion of the lower staff of a tire hook, the step being shown in section to exhibit the mounting engagement of the step upon the staff.

Fig. 4 is a detail of a connection between a tire hook staff and a cross brace, portions being broken away and shown in vertical section.

As shown generally in Figs. 1 and 2, my mechanic's ladder includes as principal structural members, a pair of tire hooks 10 and 11 spaced apart from one another by brace 12. Each of the tire hooks is provided with a straight staff 13—14 respectively. The size of these parts may, of course, be different to meet various uses on larger or smaller vehicles, but a standardized mechanic's ladder made in accord with my invention will be found most universally useable if the curvature of the tire hooks 10 and 11 be such as to be receivable over the upper portion of a truck tire having a wheel diameter of 20 inches and a tubular cross-section of nine to eleven inches. In such a standardized ladder, the brace 12 will be of such length as to hold the staffs 13—14 on 19⅜ inch centers. In Fig. 1 the tire shown in dotted lines is a 20 by 10 inch pneumatic tire 15 and the rim size of wheel 16 is 20 inches. As shown in Fig. 1, a cross-section through fender 17 shows the general relationship of a representative vehicle fender with respect to wheel 16 and tire 15.

When the hooks 10—11 are placed over a tire 15 as indicated in Fig. 1, the staffs 13 and 14 depend therefrom and are sufficiently long so that the lower ends of the staffs bear against the sidewalls of the tire. Each of the staffs 13 and 14 is mounted to rotate in a T fitting 18—19 respectively securely welded or otherwise rigidly secured to brace 12. As shown in Fig. 4, each of the staffs is provided with a collar 20 and a collar 21 welded or otherwise positively secured to the staff respectively above and below the T fitting to prevent the T fitting and the brace 12 from sliding up or down upon the particular staff. However, each staff is freely revoluble in its T fitting so that the hooks may move to the positions shown in dotted lines in Fig. 2. Thus the hooks may be moved to the dotted line positions shown in Fig. 2 when my ladder is to be applied to a tire 15. The mechanic may then slide the hooks between the fender 17 and the tire 15 with sufficient upward movement to permit a swinging motion of the hooks as the hooks are applied in spaced relation on the top portion of the tire.

At the lower end of each of the staffs, I provide holes for the reception of a key 25. When this key is removed, it is possible to assemble upon the depending staff 13 and 14 the ladder step or tread 26 which provides the support upon which the mechanic may stand while he works upon portions of the truck above and beyond fender 17. The tread 26 is shaped as shown most clearly in Fig. 2. In addition to the conventional step tread 27 with adequate stiffener flanges 28, 29 and 30, the tread is provided with locking ears 31 and 32 apertured at 33—34 to slidably receive the staffs 13—14 respectively. The ears are also stiffened with flanges 35 and are held by such flanges at such an angle with respect to the top surface of the tread 27 that when the tread is locked in position as described below, the tread is slightly "tipped" toward the vehicle. Since the tread material is made of sheet metal of relatively thin gauge, the ears are readily slidable upon the staffs 13—14 when the staffs are fairly accurately alined in the apertures 33 and 34, but as soon as the eccentrically disposed weight of the tread 26 "cramps" the ears upon the staffs and especially when the weight of a mechanic is applied to the tread 26, the ladder tread is positively positioned at any height to which the tread was raised before the eccentric weight referred to is applied.

The keys 25 are merely provided to assure that the tread 26 and ears 31 and 32 are not accidentally dropped from the staffs at a time when no weight or stress is being applied to the tread. It will be understood that while Fig. 1 shows merely two possible positions of the tread, it is possible to locate the tread in any position of upper or lower adjustment and the cramping effect will take place at any height selected.

When my ladder has served its purposes, it is only necessary to raise the staffs 13—14 a short distance to permit the hooks 10—11 to be swung to one of the dotted line positions shown in Fig. 2 so that the hooks may be slidably removed through the space between the fender and the tire.

It is of special importance that I have provided infinitely adjustable means for positioning the tread despite the fact that the hooks for engagement over the top portion of a tire may at one time be engaged with a tire of one size and at another time with a tire of a different size. This requires that the hooks may be at any of several different angles with respect to the tread of the ladder and requires that the engagement of the tread in a position of adjustment upon a staff may be ready for clamping engagement. This is provided for in my ladder construction.

I claim:

A ladder for engagement against the side of a tired wheel comprising a pair of staffs of cylindrical material each shaped with an elongated straight staff portion and an upper hooked extremity, a brace extending between the upper ends of the straight portions of said staffs and provided with bearings positioned to receive said upper ends of said staff portions whereby each of said staffs and said upper hooked extremity thereof is independently revolvable in one of said bearings, and a plane step tread having spaced ears along one side and extending marginally thereof, said ears being slightly angularly disposed with reference to the plane of said step tread and each of said ears being provided normal to said ears with a bore of a diameter to snugly receive one of said staffs, said step tread and said ears being provided with a continuous depending flange to stiffen said step tread and said ears and hold said step tread and said ears in said angular relationship, whereby in any position of said upper hooked extremity of either one of said pair of staffs over said tire a cylindrical surface of each said straight staff portion is presented in each said bore provided in each said ears for automatic clamping engagement therewith due to weight on said step tread eccentrically placed with respect to the longitudinal axis of said staffs.

References Cited in the file of this patent

UNITED STATES PATENTS

| | | |
|---|---|---|
| 491,093 | Edgerton | Feb. 7, 1893 |
| 557,063 | Faneuf | Mar. 24, 1896 |
| 602,125 | Burrows | Apr. 12, 1898 |
| 917,805 | Shaw | Apr. 13, 1909 |
| 1,039,647 | Carter | Sept. 24, 1912 |
| 1,205,594 | Close | Nov. 21, 1916 |
| 1,240,301 | Bower | Sept. 18, 1917 |
| 2,378,678 | Anderson | June 19, 1945 |
| 2,494,581 | Prigg | Jan. 17, 1950 |
| 2,639,951 | Allenbaugh | May 26, 1953 |

FOREIGN PATENTS

| | | |
|---|---|---|
| 414,564 | France | June 22, 1910 |